United States Patent
Takizawa et al.

(10) Patent No.: US 6,537,178 B1
(45) Date of Patent: Mar. 25, 2003

(54) LOCKUP CONTROL DEVICE FOR TRANSMISSION

(75) Inventors: Satoshi Takizawa, Yokohama (JP); Tateki Jozaki, Isehara (JP); Masato Koga, Atsugi (JP); Masatoshi Akanuma, Fujisawa (JP); Mitsuru Watanabe, Hadano (JP); Shigeki Shimanaka, Hadano (JP); Hiroyasu Tanaka, Zama (JP); Junya Takayama, Oomiya (JP)

(73) Assignee: Nissan Motor Co., Ltd., Yokohama (JP)

( * ) Notice: Subject to any disclaimer, the term of this patent is extended or adjusted under 35 U.S.C. 154(b) by 62 days.

(21) Appl. No.: 09/672,692

(22) Filed: Sep. 29, 2000

(30) Foreign Application Priority Data

Sep. 30, 1999 (JP) .............................. 11-278635

(51) Int. Cl.[7] .............................................. B60K 41/22
(52) U.S. Cl. ........................... 477/76; 477/98; 477/168; 477/174
(58) Field of Search ............................. 477/76, 97, 98, 477/168, 174

(56) References Cited

U.S. PATENT DOCUMENTS

| | | | | |
|---|---|---|---|---|
| 3,895,541 A | * | 7/1975 | Nohira et al. ................ 477/97 |
| 4,449,618 A | * | 5/1984 | Suga et al. ................ 477/98 X |
| 4,687,083 A | * | 8/1987 | Sotoyama et al. .......... 477/169 |
| 5,131,293 A | * | 7/1992 | Kaiser et al. ................... 477/98 |
| 5,425,687 A | * | 6/1995 | Taga et al. .............. 477/174 X |
| 5,643,136 A | * | 7/1997 | Kono et al. ............. 477/174 X |
| 5,722,912 A | * | 3/1998 | Narita ...................... 477/174 X |
| 5,876,301 A | * | 3/1999 | Tabata et al. ............. 477/98 X |
| 5,954,618 A | * | 9/1999 | Mikami et al. .............. 477/174 |
| 6,019,703 A | * | 2/2000 | Black et al. ................. 477/168 |
| 6,248,040 B1 | * | 6/2001 | Minowa et al. ............... 477/98 |

FOREIGN PATENT DOCUMENTS

JP 2903456 3/1999

* cited by examiner

Primary Examiner—Sherry Estremsky
Assistant Examiner—Ha Ho
(74) Attorney, Agent, or Firm—Foley & Lardner

(57) ABSTRACT

After an engine (1) has started, a controller (6) starts determining whether lockup should be prohibited or permitted based on the cooling water temperature of an engine (1) or the oil temperature of a transmission (2). Once it has been determined that lockup should be permitted, the controller (6) stops determining whether lockup should be prohibited or permitted until the next time the engine (1) is started. In this way, once the conditions for determining that lockup should be permitted hold, lockup prohibition or permission based on the engine cooling water temperature or transmission oil temperature is no longer determined, so repeat engaging and disengaging of the lockup clutch (5) due to fluctuations of engine cooling water temperature or transmission oil temperature, is prevented.

5 Claims, 5 Drawing Sheets

LOCKUP CONTROL DEVICE FOR TRANSMISSION

FIELD OF THE INVENTION

The present invention relates to a lockup control device for a transmission with a lockup torque converter.

BACKGROUND OF THE INVENTION

Normally, in a vehicle provided with a transmission fitted with a torque converter, the torque converter is provided with a lockup clutch. When the lockup clutch is edged and the torque converter is locked, the torque converter no longer slips, the engine rotation speed can be decreased by a corresponding amount, and fuel cost performance is increased.

The lockup clutch normally engages when the vehicle running condition is in a predetermined lockup region. However, the operation of the lockup clutch is not stable when the transmission oil temperature is still low, so lockup must be prevented. In the prior art, the transmission oil temperature is compared with a predetermined threshold value. When the oil temperature is lower than the threshold value lockup is prohibited, whereas when it is higher than the threshold value lockup is permitted.

When the engine is warming up, lockup, which is a factor responsible for decreasing the engine rotation speed, must be prevented to increase the catalyst temperature and to enhance the activity of the catalyst. In the prior art, it is determined whether or not to permit or prohibit lockup by comparing the engine cooling water temperature with a threshold value. Alternatively, it is determined whether to permit or prohibit lockup by determining whether the elapsed time since startup has reached a predetermined time which is set according to the transmission oil temperature on startup, as disclosed in JP-B2-2903456 published by the Japanese Patent Office in 1999.

SUMMARY OF THE INVENTION

However, if it is determined whether to permit or prohibit lockup by comparing the transmission oil temperature or engine cooling water temperature with a predetermined value, as these temperatures fluctuate due to the effect of oil flow or change-over of cooling water flow due to a thermostat, lockup may be repeatedly prohibited and permitted due to these fluctuations about the threshold values, and hunting may occur in the lockup control.

Hunting may be suppressed to some extent by incorporating hysteresis in the threshold value used for the determination, but if a fluctuation of transmission oil temperature or engine cooling water temperature in excess of the hysteresis, the same effect will take place.

Further, in the method disclosed in JP-B2-2903456, lockup is not prohibited again once it has been permitted, so hunting does not occur. However, the determination is not based on the real transmission oil temperature or engine cooling water temperature, so the transmission oil temperature or engine cooling water temperature when lockup is permitted, varies with the running state on startup. In other words, the running state wherein lockup is permitted fluctuates.

It is therefore an object of this invention to prevent hunting in lockup control and permit lockup in the same running state, when lockup is prohibited when the transmission oil temperature is low or engine cooling water temperature is low.

In order to achieve above object, this invention provides a lockup control device for a transmission having a torque converter with a lockup clutch, comprising a first sensor which detects a parameter which varies according to a warmup state of a vehicle, a second sensor which detects a running state of the vehicle, and a microprocessor programmed to determine whether warmup is complete based on the parameter, enable to engage the lockup clutch once the microprocessor has determined that warmup is complete, and control the engagement of the lockup clutch according to whether or not the running state is in a predetermined lockup region when it is determined that warmup is complete.

According to an aspect of the invention, this invention provides a lockup control device for a transmission having a torque converter with a lockup clutch, comprising a first sensor which detects a parameter which varies according to a warmup state of a vehicle, a second sensor which detects a running state of the vehicle, and a microprocessor programmed to determine whether warmup is complete based on the parameter only when the lockup clutch is disengaged, and control the engagement of the lockup clutch according to whether or not the running state is in a predetermined lockup region when it is determined that warmup is complete.

According to another aspect of the invention, this invention provides a lockup control device for a transmission having a torque converter with a lockup clutch, comprising a first sensor which detects a parameter which varies according to a warmup state of a vehicle, a second sensor which detects a running state of the vehicle, and a microprocessor programmed to determine whether warmup is complete based on the parameter, determine a lockup permission condition is present when it is determined that warmup is complete or when it is determined that warmup is not complete and the lockup clutch is engaged, and control the engagement of the lockup clutch according to whether or not the running state is in a predetermined lockup region when it is determined that the lockup permission condition is present The details as well as other features and advantages of this invention are set forth in the remainder of the specification and are shown in the accompanying drawings.

DESCRIPTION OF THE PREFERRED EMBODIMENTS

Figure 1:
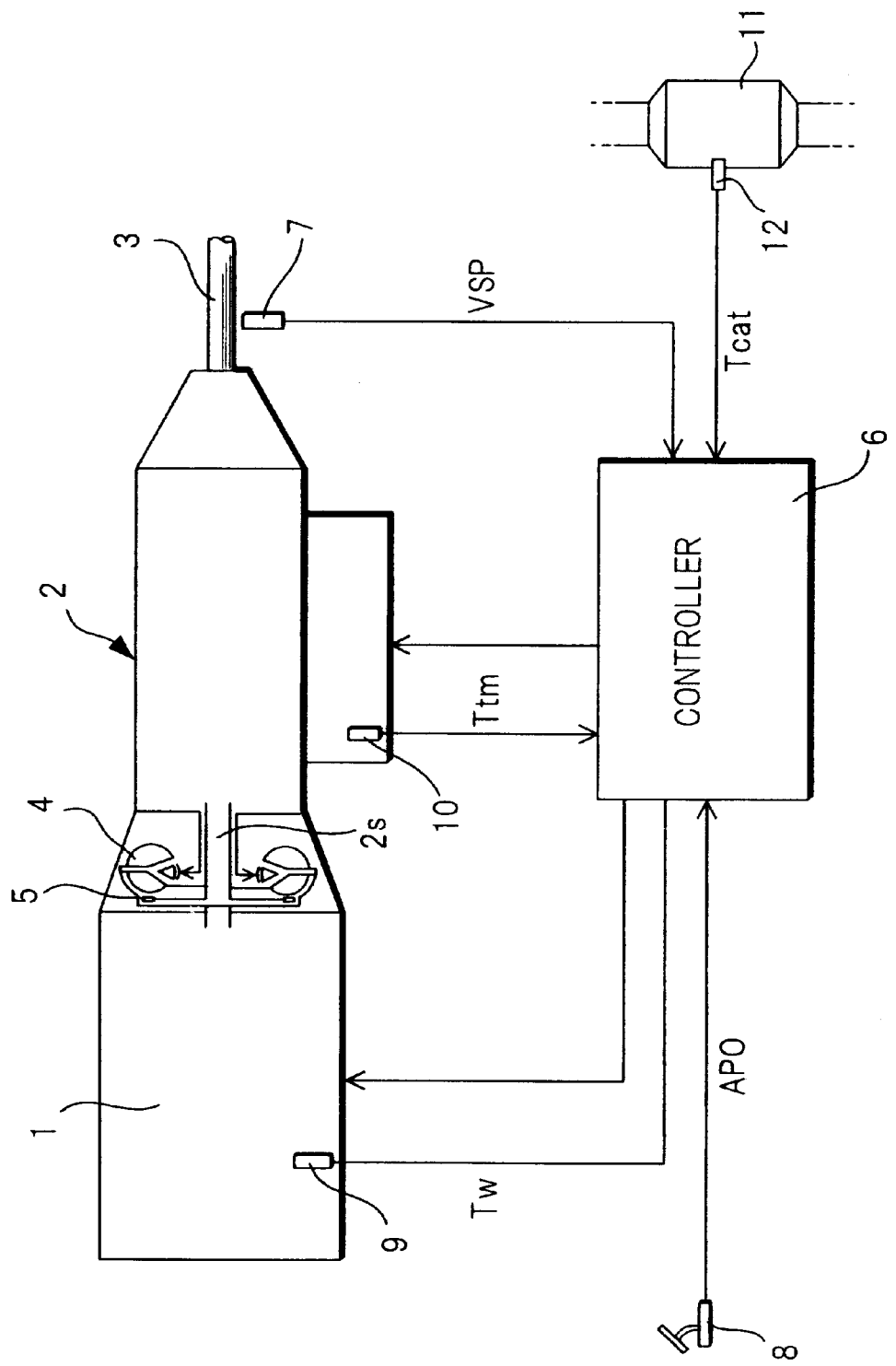
FIG. 1 is a schematic diagram of a transmission with a lockup control device according to the present invention.

Referring to FIG. 1 of the drawings, a vehicle comprises an engine 1, automatic transmission 2 and output shaft 3. The output of the engine 1 is transmitted to drive wheels, not shown, via the transmission 2 and output shaft 3.

The transmission 2 is a planetary gear type transmission provided with a torque converter 4. The torque converter 4 comprises a lockup clutch 5.

When the lockup clutch 5 is engaged, a friction disk fitted to a transmission input shaft 2s is pushed against a torque converter housing, an impeller and turbine do not slip, and the engine rotation speed coincides with the rotation speed of the transmission input shaft 2s. The transmission 2 may be a V-belt continuous variable transmission or a toroidal continuously variable transmission.

The vehicle is provided with a vehicle speed sensor 7 which detects a vehicle speed VSP based on the rotation speed of the output shaft 3, an accelerator depression amount sensor 8 which detects an accelerator pedal depression amount APO, an engine cooling water temperature sensor 9 which detects a cooling water temperature Tw of the engine 1, a transmission oil temperature sensor 10 which detects an oil temperature Ttm of the transmission 2, and a catalyst temperature sensor 12 which detects a temperature Tcat of an exhaust gas catalyst 11 of the engine 1.

A controller 6 comprises a microprocessor, memory and input/output interface, signals from the aforesaid sensors 8–12 being input to this controller 6. The controller 6 determines the running state of the vehicle based on the input signals, and controls the rotation speed of the engine 1 and a speed ratio of the transmission 2.

The controller 6 looks up a lockup region determining map described later, and engages the lockup clutch 5 when it is determined that the vehicle running state is in a predetermined lockup region. When the lockup clutch 5 is engaged, the torque converter 4 no longer slips. As a result, the rotation speed of the engine 1 can be reduced, and fuel cost performance can be increased.

Herein, when the oil temperature of the transmission 2 is low, operation of the lockup clutch 5 is not stable, so lockup must be prevented. Also, as it is a factor which decreases the rotation speed of the engine 1, lockup must also be prevented to enhance activity of the catalyst 11 during warmup of the engine 1.

The controller 6 therefore performs lockup control as described below.

Figure 2:
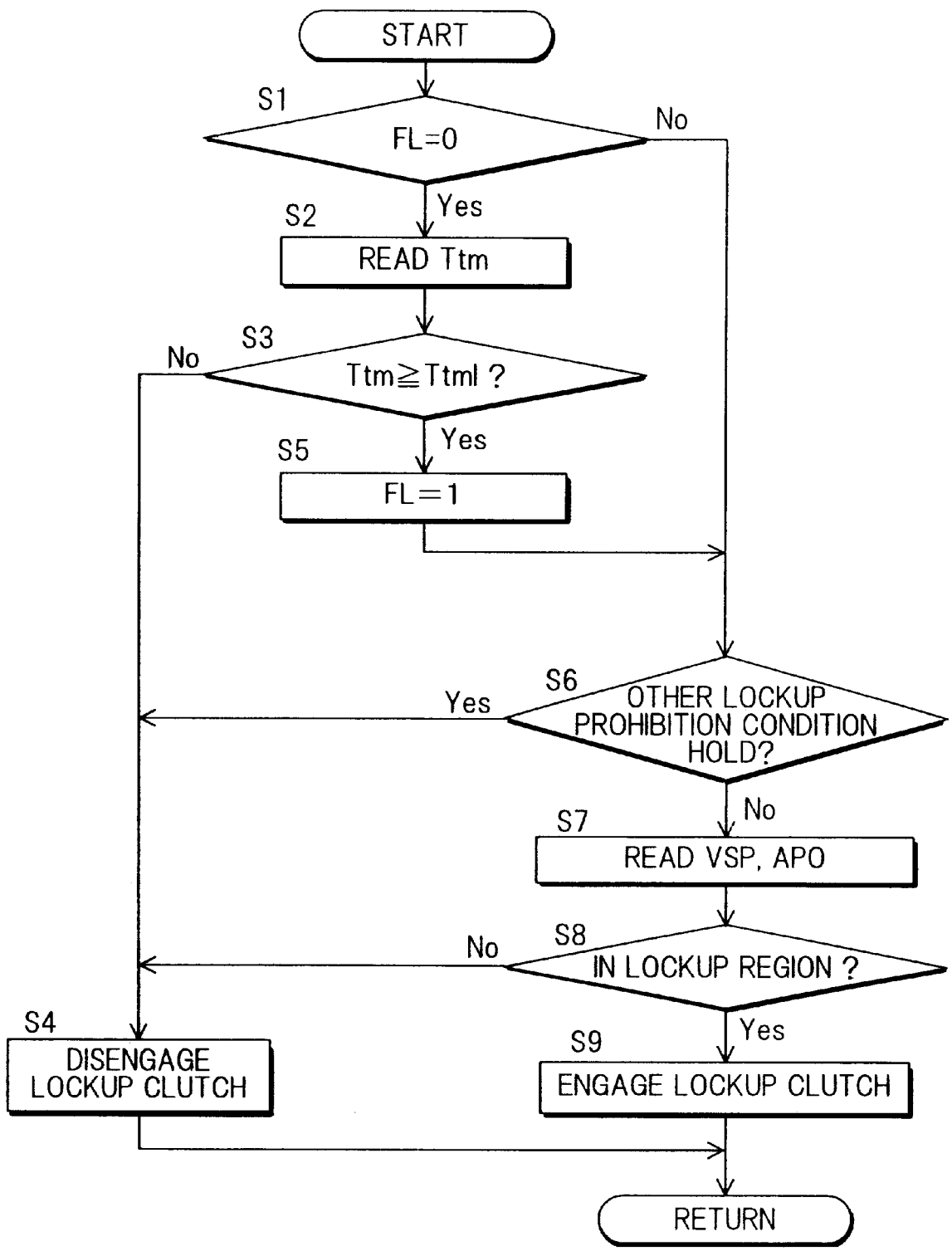
FIG. 2 is a flowchart showing a lockup control process performed in the lockup control device.

FIG. 2 is a flowchart showing the lockup control process performed by the controller 6. This flowchart is executed at a predetermined interval, for example 10 miliiseconds. In this embodiment, it will be assumed that a lockup permission flag FL is reset to "0" when the controller 6 is reset.

On startup, when the controller 6 is reset (power is switched on), it is first determined whether or not the lockup permission flag FL is "0" (step S1). When the controller 6 is reset, the lockup permission flag FL is reset to "0" showing that lockup is prohibited, so the routine proceeds to a step S2. In the step S2, the oil temperature Ttm of the transmission 2 is read.

Next, in a step S3, it is determined whether or not the transmission oil temperature Ttm is higher than a predetermined temperature Ttml (e.g., 40° C.). Immediately after startup, the transmission oil temperature is still low and operation of the lockup clutch 5 is not stable, so the routine proceeds to a step S4 and the lockup clutch 5 is left in the disengaged state. The impeller and turbine are then rotated relative to one another to stir the oil and promote warmup of the transmission 2.

Subsequently, when the transmission oil temperature Ttm increases above the predetermined temperature Ttml, the routine proceeds from the step S3 to a step S5, and "1" is set to the lockup permission flag FL showing that lockup is permitted.

Next, in a step S6, it is determined whether or not other lockup prohibition conditions (operation of antilock braking system, or operation of traction control system, etc.) hold. If other lockup prohibition conditions hold, the routine proceeds to the step S4 and the lockup clutch 5 is disengaged, and if they do not hold, the routine proceeds to a step S7.

In the step S7, the accelerator depression amount APO detected by the accelerator depression amount sensor 8, and the vehicle speed VSP detected by the vehicle speed sensor 7, are read.

Figure 3:
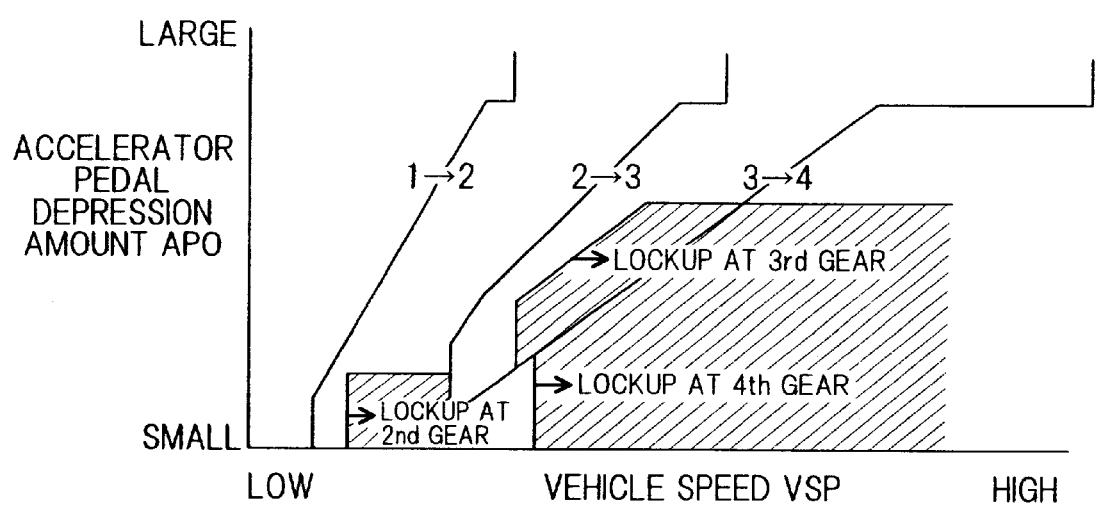
FIG. 3 is a map used in lockup control.

In a step S8, it is determined whether or not the vehicle running state is in the lockup region by looking up a predetermined lockup region determining map based on the accelerator depression amount APO and vehicle speed VSP. FIG. 3 shows an example of the lockup region determining map when an upshift is performed. When the vehicle running state is in the shaded area in the figure, it is determined that the vehicle is in the lockup region.

When it is determined that the vehicle running state is in the lockup region, the routine proceeds to a step S9 and the lockup clutch 5 is engaged, and when it is determined that the vehicle running state is not in the lockup region, the routine proceeds to the step S4 and the lockup clutch 5 is disengaged.

Thereafter, this flowchart is performed repeatedly until the engine 1 stops. Once the lockup permission flag FL is set to "1" in the step S5, it remains at "1" until the controller 6 is reset again, so processing always proceeds from the step S1 to the step S6, and only the determination of whether or not other prohibition conditions hold (S6) and whether or not the vehicle running state is in the lockup region (S7, S8) are performed.

Therefore, by performing this lockup control, it is possible to permit lockup with an appropriate timing when warmup is completed.

After lockup permission is found to hold based on the transmission oil temperature Ttm, as determination of lockup prohibition or permission based on the transmission oil temperature Ttm is no longer performed until the controller 6 is again reset and lockup permission continues, engaging and disengaging of the lockup clutch 5 due to fluctuation of the transmission oil temperature Ttm is prevented from repeating.

Herein, lockup prohibition or permission is determined based on the transmission oil temperature Ttm which shows the warmup state of the transmission 2, but lockup prohibition or permission may be determined based on the cooling water temperature Tw of the engine 1 or the temperature Tcat of the exhaust gas catalyst 11.

Next, a second embodiment will be described.

Figure 4:
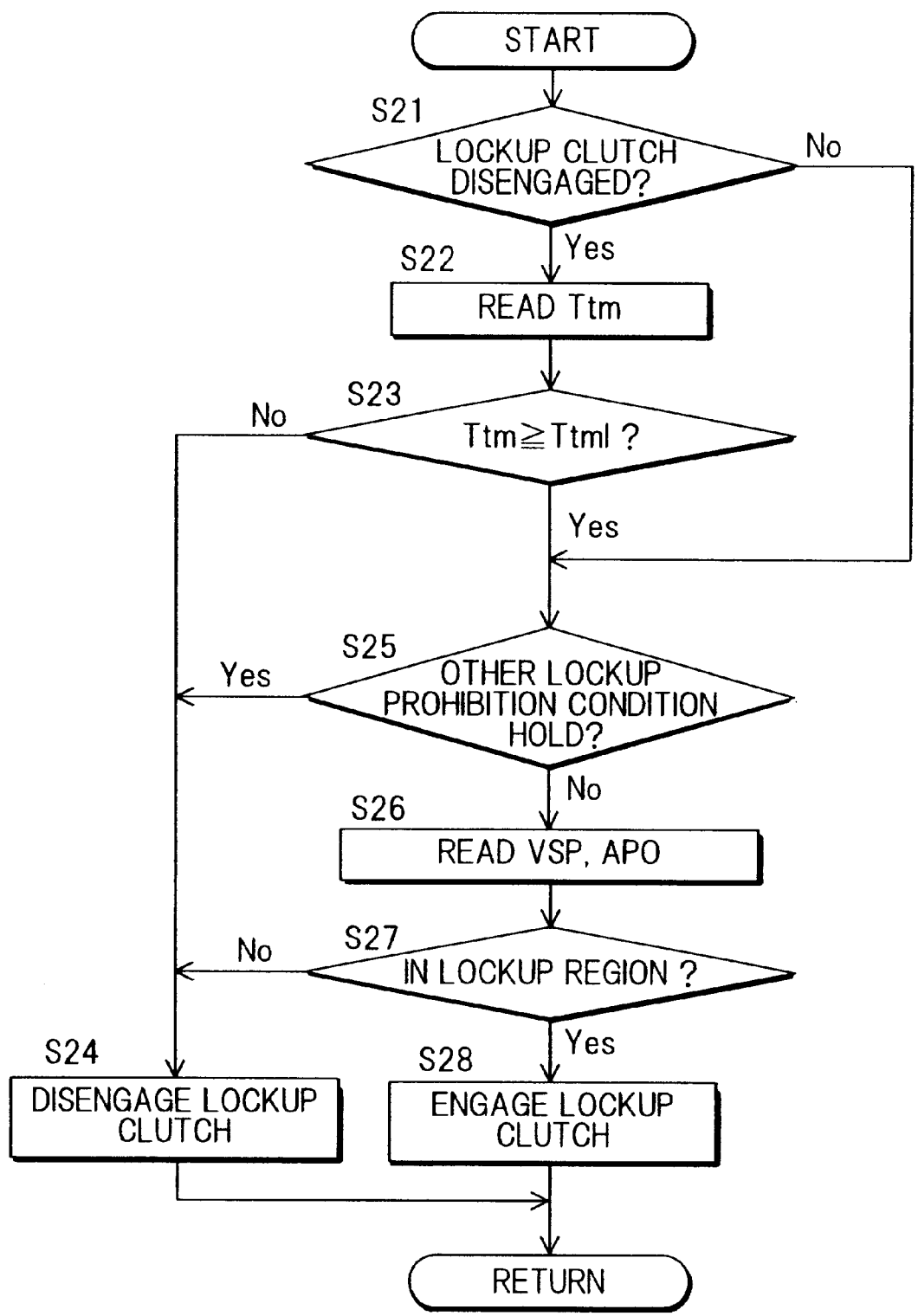
FIG. 4 is similar to FIG. 2, but showing a second embodiment of the invention.

FIG. 4 is a flowchart showing another example of lockup control performed by the controller 6. This flowchart is performed at a predetermined interval, for example 10 milliseconds. According to this embodiment, the lockup clutch 5 is disengaged when the controller 6 is reset.

On startup, when the controller 6 is reset, it is first determined whether the lockup clutch 5 is disengaged (step S21). The lockup clutch 5 is disengaged when the controller 6 is reset, so the routine proceeds to a step S22. In the step S22, the transmission oil temperature Ttm is read.

Next, in a step S23, it is determined whether or not the transmission oil temperature Ttm is greater than the predetermined temperature Ttml (e.g., 40° C.). Immediately after startup, the transmission oil temperature Ttm is still low, to the routine proceeds to a step S24 and the lockup clutch 5 remains disengaged.

Subsequently, when the transmission oil temperature Ttm exceeds the predetermined temperature Ttml, the routine proceeds from the step S23 to a step S25.

In the step S25, it is determined whether or not other lockup prohibition conditions (i.e., when antilock braking system is operating or a traction control system is operating) hold. When other prohibition conditions hold, the routine proceeds to the step S24, the lockup clutch 5 is disengaged, and when other prohibition conditions do not hold, the routine proceeds to a step S26.

In the step S26, the accelerator depression amount APO and vehicle speed VSP are read.

In the step S27, it is determined whether or not the running state is in the lockup region by looking up a predetermined map based on the accelerator depression amount APO and vehicle speed VSP. When the running state is in the lockup region, the routine proceeds to a step S28 and the lockup clutch 5 is engaged, and when the running state is not in the lockup region, the routine proceeds to the step S24 and the lockup clutch 5 is disengaged.

Subsequently, only when the lockup clutch 5 is disengaged, the routine proceeds from the step S21 to the step S22, and lockup prohibition or permission is determined based on the transmission oil temperature Ttm. Conversely, when the lockup clutch 5 is engaged, the routine proceeds from the step S21 to the step S25, and determination of lockup prohibition or permission based on the transmission oil temperature Ttm is not performed.

Therefore, according to this embodiment, lockup prohibition or permission is determined based on the transmission oil temperature Ttm only when the lockup clutch 5 is disengaged. As a result, when the lockup clutch 5 is engaged, the lockup clutch 5 is no longer disengaged even if the transmission oil temperature Ttm decreases to or below the predetermined temperature Ttm1, and hunting of lockup control is avoided as in the preceding embodiment.

Unlike the preceding embodiment, when the lockup clutch 5 is disengaged, lockup prohibition or permission is determined based on the transmission oil temperature Ttm. When the transmission oil temperature Ttm decreases sharply when the lockup clutch 5 is disengaged, for example when the vehicle is left idle for a long period of time in a cold location, in the preceding embodiment there is a possibility that lockup permission would continue, but in this embodiment, lockup is prohibited again and this problem does not arise.

Figure 5:
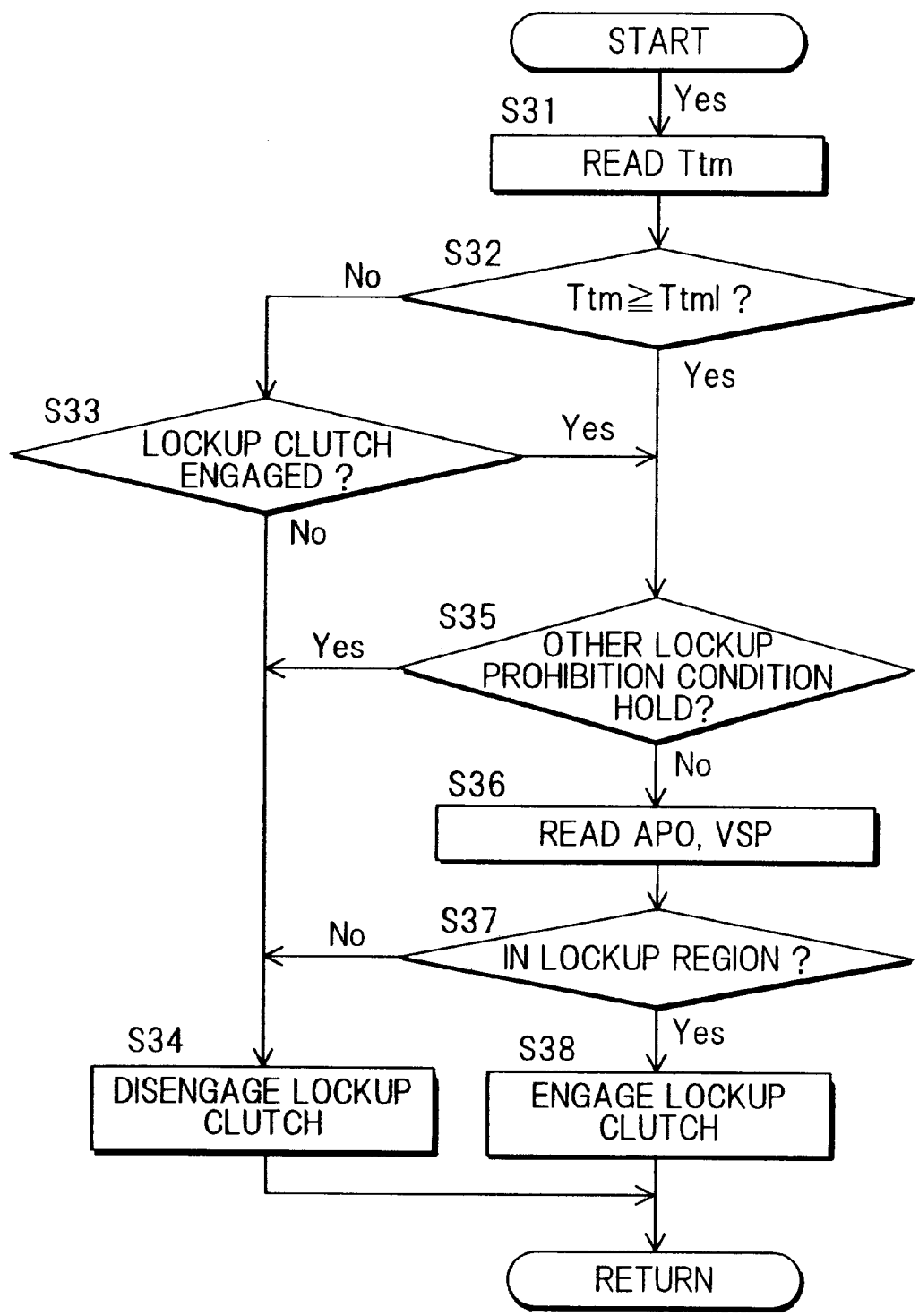
FIG. 5 is similar to FIG. 2, but showing a third embodiment of the invention.

Herein, lockup prohibition or permission is determined according to the transmission oil temperature Ttm only when the lockup clutch 5 is disengaged, but, as shown in FIG. 5, it is also possible to determine lockup prohibition or permission at all times (step S32), and when the lockup clutch 5 is engaged, not to disengage the lockup clutch 5 even if lockup prohibition is determined based on the transmission oil temperature Ttm (step S33) (third embodiment). Under this control, an identical effect is obtained.

Further, also in the second and third embodiments, lockup prohibition or permission is determined based on the transmission oil temperature Ttm, but lockup prohibition or permission may be determined based on the cooling water temperature Tw of the engine 1 or the temperature Tcat of the exhaust gas catalyst 11.

The entire contents of Japanese Patent Application P11-278635 (filed Sep. 30, 1999) are incorporated herein by reference.

Although the invention has been described above by reference to a certain embodiment of the invention, the invention is not limited to the embodiment described above. Modifications and variations of the embodiments described above will occur to those skilled in the art, in light of the above teachings. The scope of the invention is defined with reference to the following claims.

What is claimed:

1. A lockup control device for a transmission having a torque converter with a lockup clutch, comprising:

a first sensor which detects a parameter which varies according to a temperature related to a transmission oil temperature state of a vehicle;

a second sensor which detects a running state of the vehicle; and a microprocessor programmed to:
   determine whether the temperature related to the transmission oil temperature is complete based on the parameter,
   enable engagement of the lockup clutch once the microprocessor has determined that the temperature related to the transmission oil temperature is complete, and
   control the engagement of the lockup clutch according to whether or not the running state is in a predetermined lockup region when it is determined that the temperature related to the transmission oil temperature is complete.

2. A lockup control device as defined in claim 1, wherein the parameter is an oil temperature of the transmission.

3. A lockup control device as defined in claim 1, wherein the parameter is a cooling water temperature of an engine.

4. A lockup control device as defined in claim 1, wherein the parameter is a temperature of an exhaust gas catalyst for an engine.

5. A lockup control device for a transmission having a torque converter with a lockup clutch, comprising:

means for detecting a parameter which varies according to a temperature related to a transmission oil temperature state of a vehicle;

means for detecting a running state of the vehicle;

means for determining whether the temperature related to the transmission oil temperature is complete based on the parameter;

means for enabling engagement of the lockup clutch once it is determined that the temperature related to the transmission oil temperature is complete; and means for controlling the engagement of the lockup clutch according to whether or not the running state is in a predetermined lockup region when it is determined that the temperature related to the transmission oil temperature is complete.

* * * * *

UNITED STATES PATENT AND TRADEMARK OFFICE
CERTIFICATE OF CORRECTION

PATENT NO. : 6,537,178 B1
DATED : March 25, 2003
INVENTOR(S) : Satoshi Takizawa et al.

It is certified that error appears in the above-identified patent and that said Letters Patent is hereby corrected as shown below:

<u>Column 6,</u>
Line 23, change "is complete" to -- has reached a particular value --.
Lines 27-28, change "is complete" to -- has reached the particular value --.
Line 33, change "is complete" to -- has reached the particular value, > wherein once the microprocessor enables engagement of the lockup clutch based on the temperature related to the transmission oil temperature, the microprocessor stops determining whether the engagement of the lockup clutch should be enabled based on the temperature related to the transmission oil temperature until the vehicle engine is restarted--.

Lines 49 and 53, change "is complete" to -- has reached a particular value --.
Line 58, change "is complete" to -- has reached the particular value, > wherein once the means for enabling engagement enables engagement of the lockup clutch based on the temperature related to the transmission oil temperature, the means for enabling engagement stops determining whether the engagement of the lockup clutch should be enabled based on the temperature related to the transmission oil temperature until the vehicle engine is restarted--.

Signed and Sealed this

Thirteenth Day of April, 2004

JON W. DUDAS
*Acting Director of the United States Patent and Trademark Office*